(12) United States Patent
Gupta

(10) Patent No.: US 11,580,528 B2
(45) Date of Patent: Feb. 14, 2023

(54) DEVICE WITH BUILT-IN BILL CAPTURE, ANALYSIS, AND EXECUTION

(71) Applicant: Bank of America Corporation, Charlotte, NC (US)

(72) Inventor: Saurabh Gupta, New Delhi (IN)

(73) Assignee: Bank of America Corporation, Charlotte, NC (US)

(*) Notice: Subject to any disclaimer, the term of this patent is extended or adjusted under 35 U.S.C. 154(b) by 174 days.

(21) Appl. No.: 16/931,619

(22) Filed: Jul. 17, 2020

(65) Prior Publication Data

US 2022/0019997 A1 Jan. 20, 2022

(51) Int. Cl.
| | | |
|---|---|---|
| G06Q 20/40 | (2012.01) | |
| G06Q 30/02 | (2012.01) | |
| G06Q 20/32 | (2012.01) | |
| G06Q 20/34 | (2012.01) | |
| G06Q 20/38 | (2012.01) | |
| G06Q 20/10 | (2012.01) | |
| G06Q 30/04 | (2012.01) | |
| G06Q 20/02 | (2012.01) | |

(Continued)

(52) U.S. Cl.
CPC ..... *G06Q 20/3415* (2013.01); *G06K 19/0723* (2013.01); *G06N 5/02* (2013.01); *G06Q 20/027* (2013.01); *G06Q 20/102* (2013.01); *G06Q 20/108* (2013.01); *G06Q 20/352* (2013.01); *G06Q 20/357* (2013.01); *G06Q 20/4012* (2013.01); *G06Q 30/04* (2013.01); *G06Q 40/02* (2013.01); *G06V 10/40* (2022.01); *G06V 30/413* (2022.01); *G06V 30/10* (2022.01)

(58) Field of Classification Search
CPC ..... G06Q 20/00–425; G06Q 30/00–08; G06Q 40/00–128; G06V 30/00–43; G06V 10/00–993; G06K 19/00–18; G06N 5/00–048

See application file for complete search history.

(56) References Cited

U.S. PATENT DOCUMENTS 8,538,806 B2 * 9/2013 Kuznetsov ............. G06Q 40/02
705/14.1
9,665,818 B1 * 5/2017 Cardinal ............ G06K 19/0702
(Continued)

FOREIGN PATENT DOCUMENTS

WO WO-2013039395 A1 * 3/2013 ............. A45C 13/42

*Primary Examiner* — John W Hayes
*Assistant Examiner* — Chenyuh Kuo
(74) *Attorney, Agent, or Firm* — Weiss & Arons LLP

(57) ABSTRACT

Systems and methods for secure and efficient bill capture, analysis, and execution are provided. A method may include capturing, via a camera embedded in a smart card, an image of a bill. The bill may include a plurality of text fields. The method may include processing the text fields via a microprocessor embedded in the smart card. The method may include determining, based at least in part on the processing of the text fields, a balance amount and a payment recipient associated with the bill. The method may also include executing a payment for the balance amount from an account associated with a user of the smart card to an account associated with the payment recipient. The executing may be performed via a wireless communication element embedded in the smart card which may be configured to provide wireless communication between the smart card and a payment gateway.

15 Claims, 6 Drawing Sheets

(51) Int. Cl.
*G06Q 40/02* (2012.01)
*G06K 19/07* (2006.01)
*G06N 5/02* (2006.01)
*G06V 10/40* (2022.01)
*G06V 30/413* (2022.01)
*G06V 30/10* (2022.01)

(56) References Cited

U.S. PATENT DOCUMENTS

| | | | |
|---|---|---|---|
| 10,013,643 B2* | 7/2018 | Yellapragada | G06Q 40/123 |
| 2015/0032612 A1* | 1/2015 | Signarsson | G06Q 20/14 |
| | | | 705/40 |
| 2017/0289127 A1* | 10/2017 | Hendrick | H04W 12/065 |
| 2019/0286805 A1* | 9/2019 | Law | G06F 21/34 |
| 2022/0067698 A1* | 3/2022 | Griffin | G06Q 20/4014 |

* cited by examiner

DEVICE WITH BUILT-IN BILL CAPTURE, ANALYSIS, AND EXECUTION

FIELD OF TECHNOLOGY

Aspects of the disclosure relate to computer systems. Specifically, aspects of the disclosure relate to systems and methods for increasing security and efficiency in digital transactional networks.

BACKGROUND OF THE DISCLOSURE

It is common for consumers to have at least one payment instrument, such as a credit or debit card, easily accessible. Consumers typically execute transactions, including the payment of bills, using those payment instruments.

However, conventional payment instruments are usually unable to execute the transactions without the assistance of other devices. Exemplary devices include laptops, desktops, and mobile phones. Requiring the use of other devices is inconvenient and inefficient. Using other devices may also expose the transaction to security risks.

Furthermore, consumers executing transactions, such as payment of utility bills, typically engage in a multi-step process that includes extracting utility bill payment information from one or more sources, and subsequently executing the payment via the instrument.

It would be desirable, therefore, to provide systems and methods for smart payment instruments with self-contained transaction architecture, thereby increasing the efficiency and security of transactions executed via the smart payment instruments. It would be further desirable for the smart payments instruments to streamline the transaction information extraction and execution process.

SUMMARY OF THE DISCLOSURE

Aspects of the disclosure relate to systems and methods for secure and efficient bill capture, analysis, and execution. A system may be a platform that includes a smart card. The smart card may include a microprocessor, a camera, and a power source for the microprocessor and the camera.

The smart card may also include a wireless communication element configured to provide wireless communication between the smart card and a payment gateway. The smart card may also include a non-transitory memory storing computer-executable instructions, that run on the microprocessor.

The smart card may be configured to capture, via the camera, an image of a bill. The bill may include a plurality of text fields. The smart card may be configured to process the text fields of the image via a text processing module. The smart card may be configured to determine, based at least in part on the processing of the text fields, a balance amount and a payment recipient associated with the bill. The smart card may also be configured to execute a payment, over the payment gateway and for the balance amount, from an account associated with a user of the smart card to an account associated with the payment recipient.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
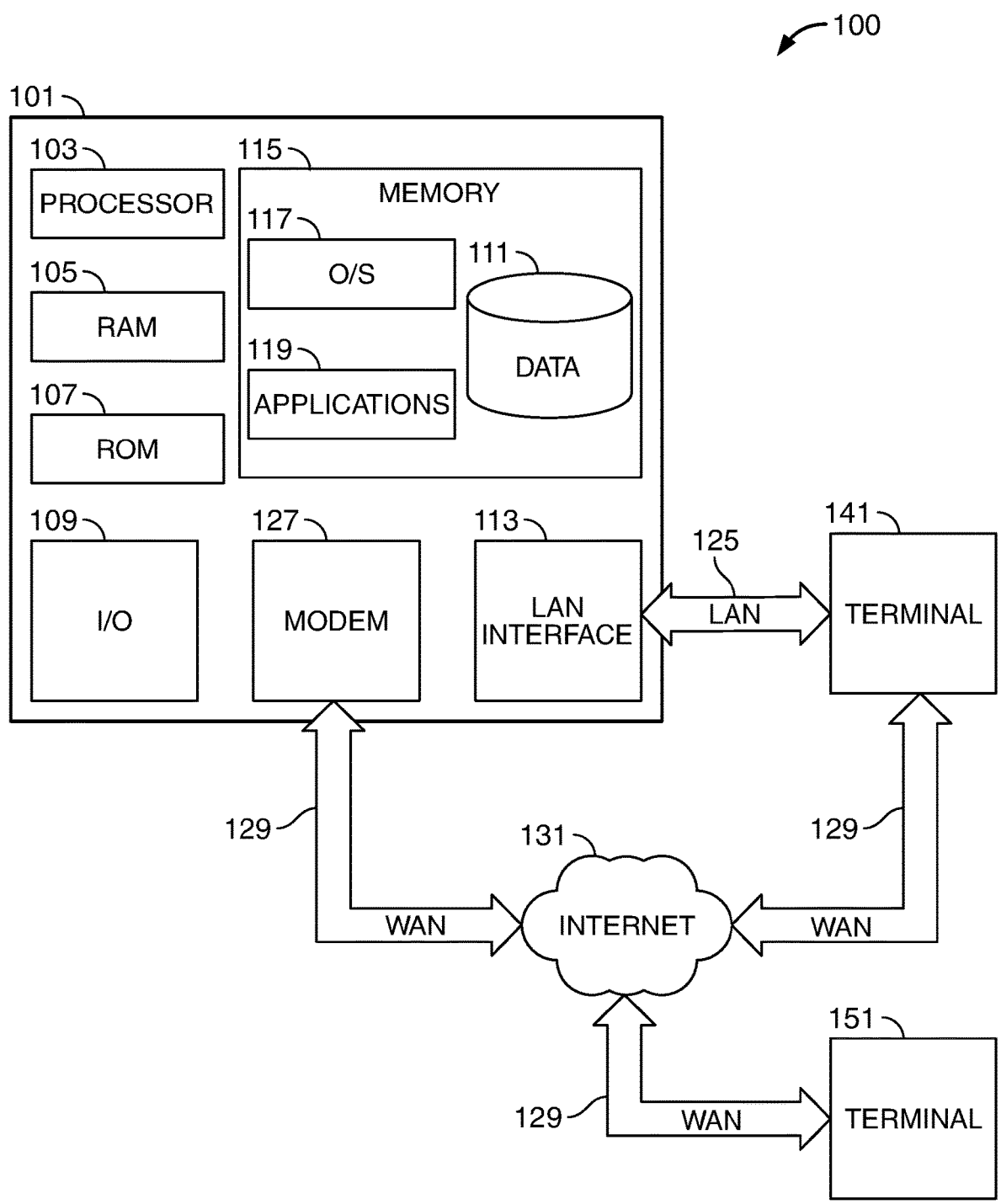
FIG. 1 shows an illustrative system in accordance with principles of the disclosure.

Systems and methods for secure and efficient bill capture, analysis, and execution are provided. A system may be a platform that includes a smart card.

In certain embodiments, the smart card may include a housing made from metal and/or plastic. The card may at least partially resemble a typical debit or credit card. The housing may have dimensions that conform to the ISO/IEC 7810 ID-1 standard. The dimensions may, in some embodiments, be no greater than 86 millimeters×54 millimeters×0.8 millimeters.

The smart card may include a microprocessor, a camera, and a power source for the microprocessor and the camera. The smart card may include a wireless communication element configured to provide wireless communication between the smart card and a central system and/or payment gateway. The smart card may include a non-transitory memory storing computer-executable instructions that, when run on the microprocessor, are configured to perform some or all the disclosed features of the platform.

In certain embodiments, the wireless communication element may be a nano wireless network interface card ("NIC").

In some embodiments, the power source may be rechargeable. The power source may recharge via solar energy. The power source may recharge via inductive charging, e.g., with a wireless recharging mechanism. The power source may recharge via a charging port. A charging port may include mini or micro Universal Serial Bus (USB) connectors, or any other suitable connector. The power source may recharge via any other suitable charging mechanism.

The microprocessor, the camera, the power source, the wireless communication element, and/or the memory may be embedded in the smart card. In some preferred embodiments, the camera may be installed so that the lens is directed out of the rear of the card.

The smart card may be configured to capture, via the camera, an image of a bill. The bill may include a plurality of text fields. The smart card may be configured to process the text fields of the image via a text or image processing module. The smart card may be configured to determine, based at least in part on the processing of the text fields, a balance amount and a payment recipient associated with the bill. The smart card may also be configured to execute a payment, over the payment gateway and for the balance amount, from an account associated with a user of the smart card to an account associated with the payment recipient.

In some embodiments, when the payment recipient is not internally detectable from the text fields (i.e., the payment recipient name is not recorded explicitly in the text fields), determining the payment recipient may include leveraging information derived from the processing of the text fields. Leveraging information may include searching the internet, via an artificial intelligence (AI) component of the platform, for a payment recipient associated with the information. The information may, in certain scenarios, include a company logo.

In some embodiments, the platform may be further configured to resolve, via an artificial intelligence (AI) component of the platform, a payment routing path for the payment recipient. Resolving the payment path may include searching a database associated with a financial institution based on the payment recipient.

In some embodiments, the platform may further include a display screen and a tactile sensor. The platform may be further configured to display payment information on the display screen. Payment information may include the balance amount and/or the payment recipient. The platform may be configured to execute the payment when authorization is received via the tactile sensor. The authorization may, for example, include entry of a personal identification number (PIN). In certain embodiments, the display screen and the tactile sensor may be combined in a touchscreen that may be embedded in the smart card.

A method for secure and efficient bill capture, analysis, and execution is provided. The method may include capturing, via a camera embedded in a smart card, an image of a bill, said bill comprising a plurality of text fields; processing, via a microprocessor embedded in the smart card and using a text processing module, the text fields of the image; determining, based at least in part on the processing of the text fields, a balance amount and a payment recipient associated with the bill; and executing a payment for the balance amount from an account associated with a user of the smart card to an account associated with the payment recipient. The executing may be performed via a wireless communication element embedded in the smart card which may be configured to provide wireless communication between the smart card and a payment gateway.

In some embodiments of the method, when the payment recipient is not internally detectable from the text fields, the determining the payment recipient may include leveraging information derived from the processing of the text fields. Leveraging information may include searching the internet, via an artificial intelligence (AI) component of the platform, for a payment recipient associated with the information. The information may include a company logo.

In some embodiments, the method may further include resolving, via an artificial intelligence (AI) component of the platform, a payment routing path for the payment recipient.

In certain embodiments, the method may also include displaying payment information on a display screen embedded in the smart card. Payment information may include the balance amount and/or the payment recipient. The method may also include executing the payment when authorization is received via a tactile sensor embedded in the smart card. Authorization may, in some embodiments, include entry of a personal identification number (PIN).

Security and efficiency associated with transactions such as bill payments are thus improved. Security may be increased by providing a platform with dedicated transactional hardware, software, and/or communication channels. Such a platform may be associated with a decreased risk of infection with malware, spyware, or other security risk factors.

Efficiency may be increased by enabling a user to perform the transaction without having to parse, decipher, and act upon information in a bill. Efficiency may also be increased by eliminating the need to use a device external to a dedicated payment instrument to perform the transaction.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input/output module may also include one or more speakers for providing audio output and a video display device for providing textual, audio, audiovisual, and/or graphical output. The input and output may be related to transaction initiation, authorization, and/or execution.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to transaction initiation, authorization, and/or execution.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
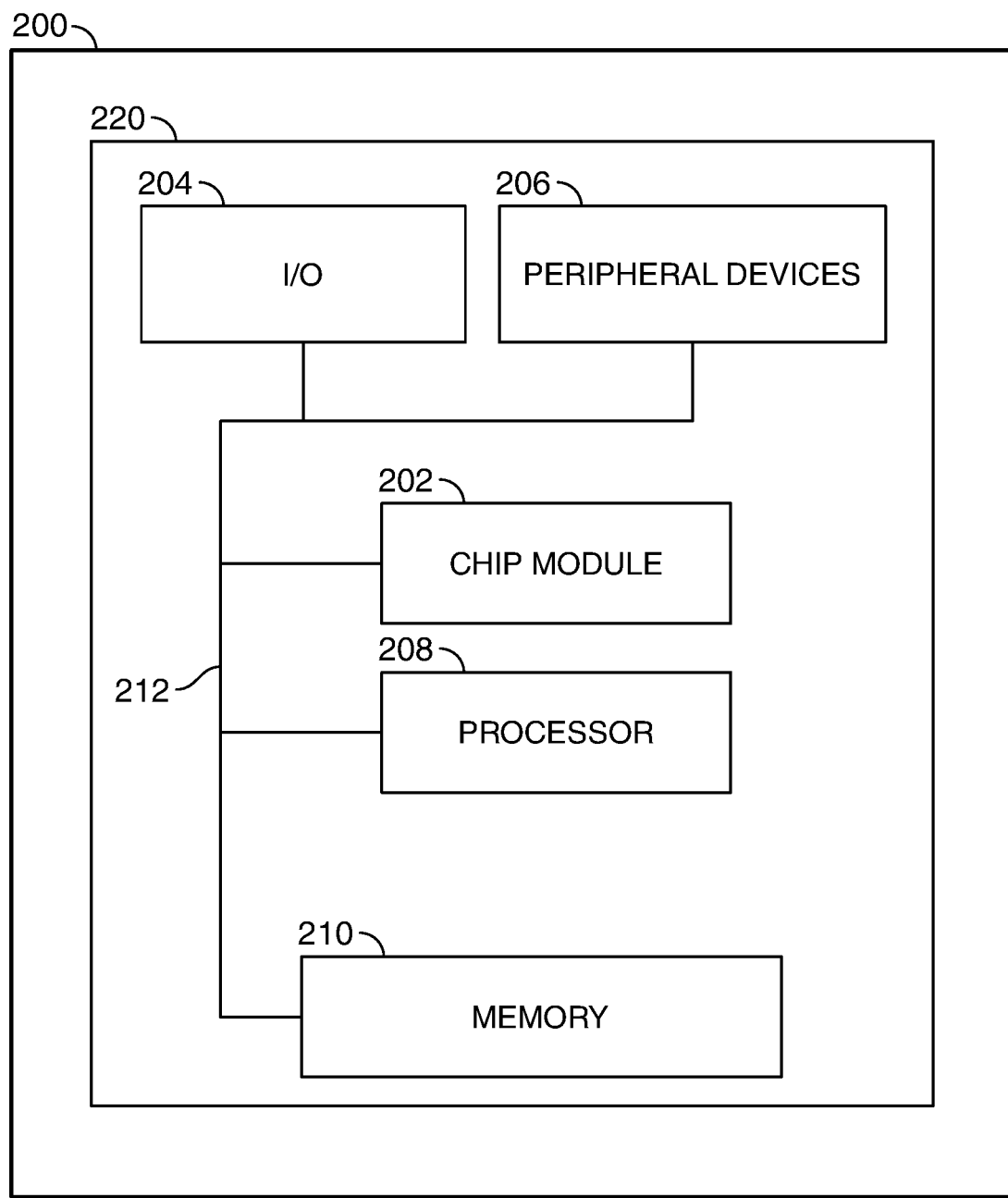
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
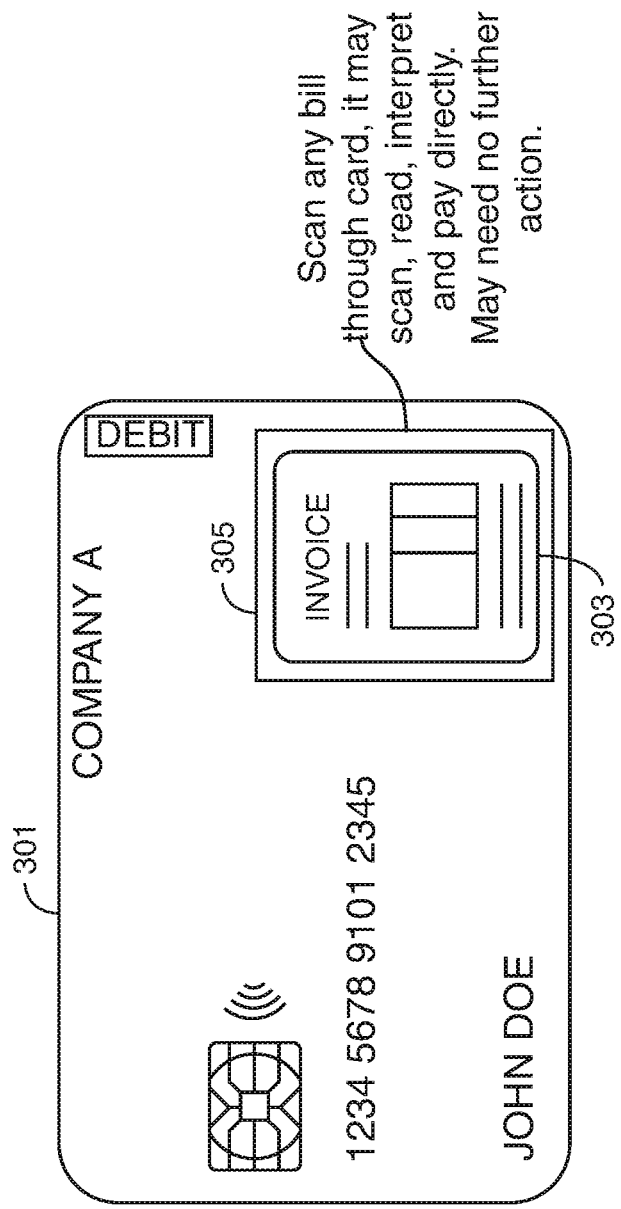
FIG. 3 shows another illustrative apparatus in accordance with principles of the disclosure.

FIG. 3 shows an exemplary smart card configured in accordance with principles of the disclosure. The smart card may be shown capturing an image of an exemplary bill. The exemplary bill may include one or more text fields.

FIG. 3 shows illustrative smart card 301 configured in accordance with principles of the disclosure. The smart cards may be shown capturing an image of illustrative bill 303. The image may be captured by a camera embedded in card 301. The image may be shown in FIG. 3 displayed on display screen 305 of card 301.

Figure 4:
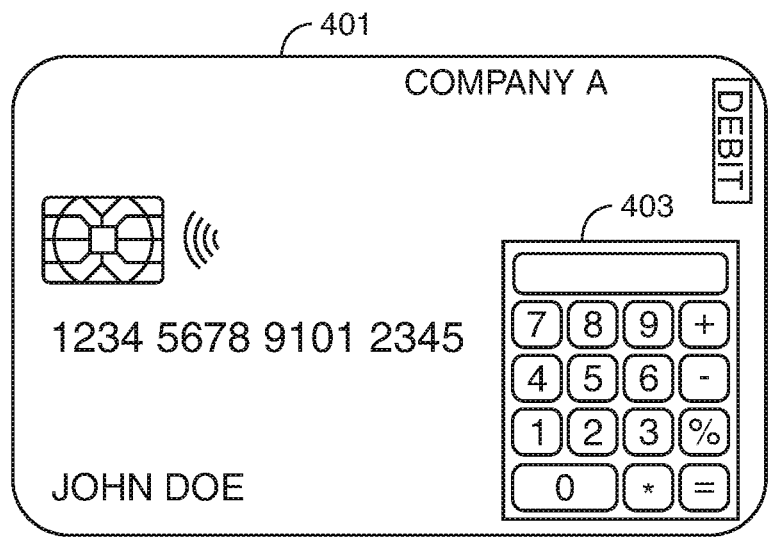
FIG. 4 shows yet another illustrative apparatus in accordance with principles of the disclosure.

FIG. 4 shows illustrative smart card 401 configured in accordance with principles of the disclosure. The smart card 401 may be shown with a display and a tactile sensor (e.g., a keypad). The keypad and tactile sensor may be combined in touchscreen 403. Smart card 401 with touchscreen 403 may be configured to include an authorization process for a transaction. The authorization may include entry of a PIN via the tactile sensor in response to a payment amount and/or a service provider displayed on the display.

Figure 5:
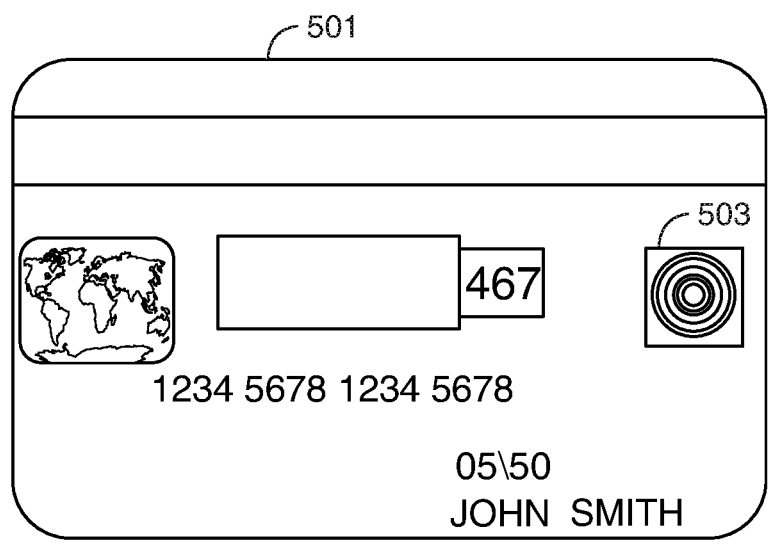
FIG. 5 shows still another illustrative apparatus in accordance with principles of the disclosure.

FIG. 5 shows illustrative smart card 501 configured in accordance with principles of the disclosure. Smart card 501 shows camera 503 embedded in the smart card housing. The camera may be embedded in the rear of the smart card. The camera may be for capturing images of bills.

Figure 6:
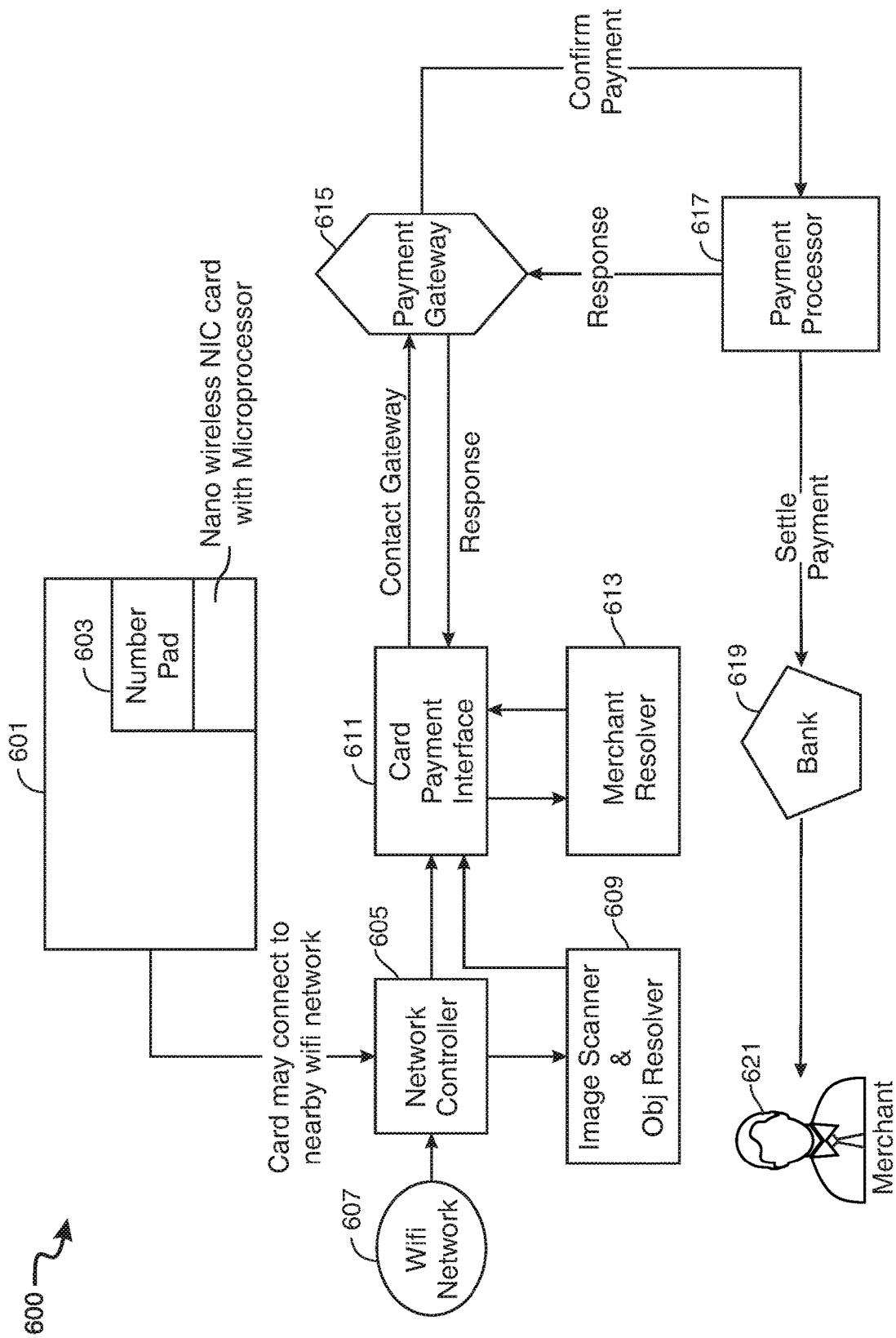
FIG. 6 shows an illustrative system diagram in accordance with principles of the disclosure.

FIG. 6 shows illustrative system diagram 600 in accordance with principles of the disclosure. Diagram 600 includes smart card 601. Smart card 601 may include a camera, wireless connector, microprocessor, and tactile sensor/display 603. Card 601 may connect to a nearby WiFi network 607 via a network controller 605. An image of a bill captured by the camera of card 601 may be processed via element 609. Processing may include parsing text fields and using image processing to determine a payment recipient and an amount owed. The card may also determine a payment pathway via merchant resolver 613. Card payment interface 611 may pay the amount owed over payment gateway 615, which may include payment processor 617.

The payment may be executed from an account of the user at bank 619 to an account associated with payment recipient 621.

Figure 7:
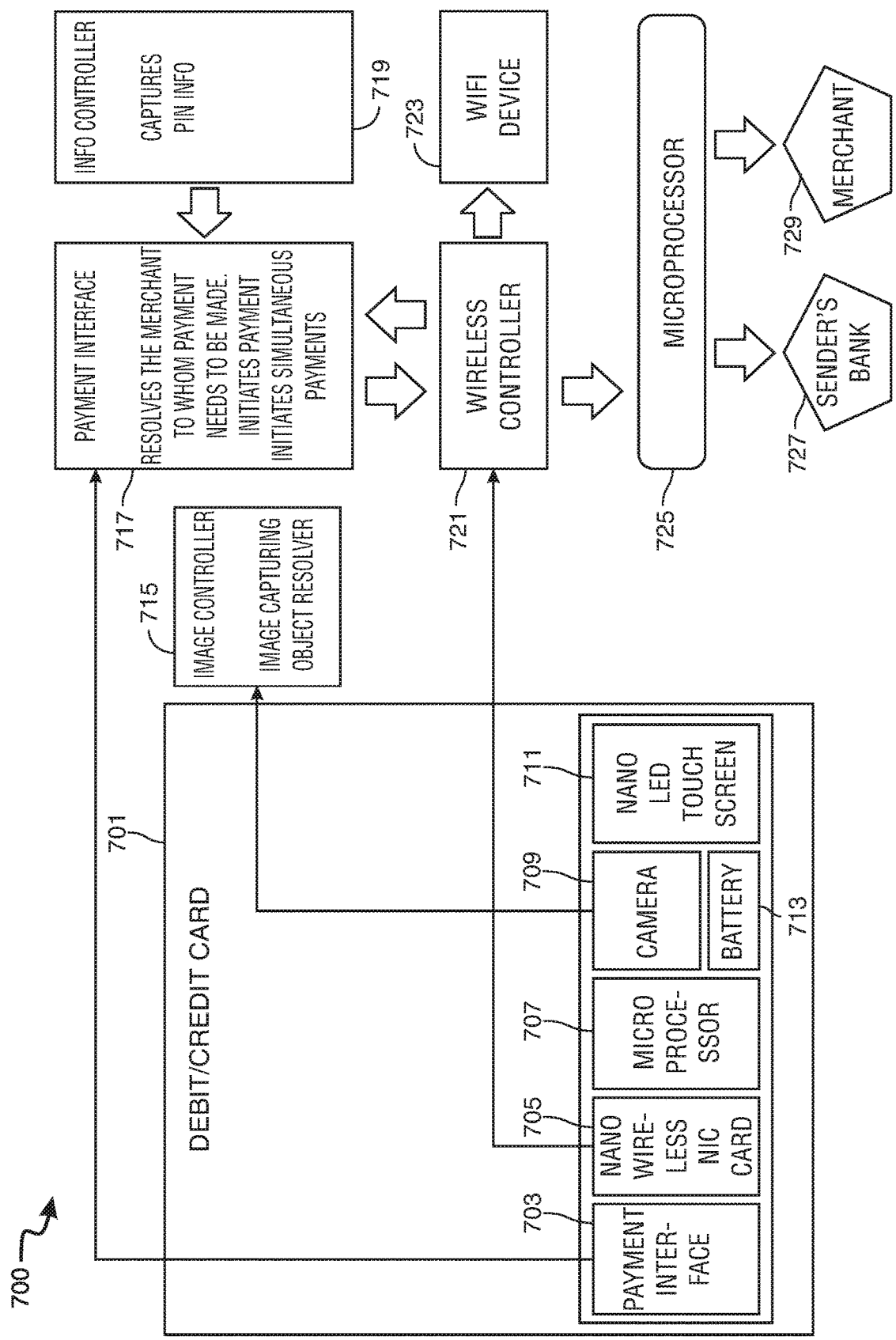
FIG. 7 shows another illustrative system diagram in accordance with principles of the disclosure.

FIG. 7 shows illustrative system diagram 700 in accordance with principles of the disclosure. Diagram 700 includes smart card 701. Card 701 includes payment interface 703, wireless connector 705, microprocessor 707, camera 709, touchscreen 711, and battery 713. Card 701 may capture an image of a bill via camera 709. The image may be processed via image controller 715. Card 701 may determine a payment recipient and an amount owed. Card 701 may execute the payment for the amount owed via payment interface 717. The payment may be authorized by the user. Authorization may leverage information entered via touchscreen 711, and may involve information controller 719. Card 701 may communicate via wireless controller 721, and may use WiFi device 723 to communicate to an outside network. Microprocessor 725 may coordinate the processing and communication of the system. Card 701 may execute payments to merchant (i.e., payment recipient) 729 through bank 727.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for a device with built-in bill capture, analysis, and execution are provided. Persons skilled in the art will appreciate that the present invention can be practiced by other than the described embodiments, which are presented for purposes of illustration rather than of limitation, and that the present invention is limited only by the claims that follow.

What is claimed is:

1. A platform for secure and efficient bill capture, analysis, and execution, said platform comprising:
   a text processing module;
   a smart card of a user;
   wherein the smart card comprises:
     a smartcard housing, wherein the smartcard housing is made from metal and/or plastic, and the smartcard housing has dimensions being no greater than 86 millimeters X 54 millimeters×0.8 millimeters;
     a microprocessor;
     a camera embedded in the smartcard housing;
     a display screen and a tactile sensor;
     a power source for the microprocessor and the camera;
     a wireless communication element; and
     a non-transitory memory storing computer-executable instructions, that, when run on the microprocessor, are configured to:
       store information of an account of the user;
       capture, via the camera, an image of a bill of the user, said bill comprising a plurality of text fields;
       process the text fields of the image via the text processing module by communicating the captured image of the bill to the text processing module via the wireless communication element;
       determine, based at least in part on the processing of the text fields, a balance amount and a payment recipient associated with the bill;
       display, via the display screen to the user, the determined balance amount and the payment recipient associated with the bill;
       receive, via the tactile sensor from the user, an authorization for a payment of the determined balance amount and the payment recipient associated with the bill; and
       based on the authorization of the payment from the user, execute the payment from the account of the user to an account associated with the payment recipient, over a payment gateway, to a payment network for payment processing.

2. The platform of claim 1, wherein the platform further comprises an artificial intelligent (AI) component, wherein determining the balance amount and the payment recipient further comprises searching the internet, via an artificial intelligence (AI) component of the platform, for information about the payment recipient.

3. The platform of claim 2, wherein the information comprises a company logo.

4. The platform of claim 1, wherein the platform further comprises an artificial intelligence (AI) component, wherein executing the payment further comprises determining, via the artificial intelligence (AI) component, a payment routing path for the payment recipient.

5. The platform of claim 1, wherein the smart card further comprises a touchscreen, wherein the touchscreen comprises the display screen and the tactile sensor.

6. The platform of claim 1, wherein the authorization comprises an entry of a personal identification number (PIN) of the user.

7. The platform of claim 1, wherein:
   the wireless communication element is a nano wireless network interface card ("NIC");
   the power source is rechargeable via solar energy, inductive charging, and/or a charging port; and
   the microprocessor, the power source, the wireless communication element, and the memory are embedded in the smart card.

8. A method for secure and efficient bill capture, analysis, and execution using a platform comprising a text processing module and a smart card of a user, wherein the smartcard comprises a smartcard housing, a microprocessor, a camera embedded in the smartcard housing, a display screen and a tactile sensor, a power source, and a wireless communication element, said method comprising:

storing, by the smart card, information of an account of the user;

capturing, by the smart card via the camera, an image of a bill, said bill comprising a plurality of text fields;

processing, by the smart card, the text fields of the image via the text processing module by communicating the captured image of the bill to the text processing module via the wireless communication element;

determining, by the smart card, based at least in part on the processing of the text fields, a balance amount and a payment recipient associated with the bill;

displaying, by the smart card and via the display screen to the user, the determined balance amount and the payment recipient associated with the bill;

receiving, by the smart card and via the tactile sensor from the user, an authorization for a payment of the determined balance amount and the payment recipient associated with the bill; and based on the authorization of the payment from the user, executing the payment from the account of the user to an account associated with the payment recipient, over a payment gateway, to a payment network for payment processing.

9. The method of claim 8, wherein the platform further comprises an artificial intelligent (AI) component, wherein determining the balance amount and the payment recipient further comprises searching the internet, via an artificial intelligence (AI) component of the platform, for information about the payment recipient.

10. The method of claim 9, wherein the information comprises a company logo.

11. The method of claim 8, wherein the platform further comprises an artificial intelligence (AI) component, wherein executing the payment further comprises determining, via the artificial intelligence (AI) component, a payment routing path for the payment recipient.

12. The method of claim 8, wherein the smart card comprises a touchscreen, wherein the touchscreen comprises the display screen and the tactile sensor.

13. The method of claim 8, wherein the authorization comprises an entry of a personal identification number (PIN) of the user.

14. The method of claim 8, wherein the smartcard housing is made from metal and/or plastic, and the housing has dimensions being no greater than 86 millimeters X 54 millimeters X 0.8 millimeters.

15. The method of claim 8, wherein:

the wireless communication element is a nano wireless network interface card ("NIC"); and the smart card further comprises an embedded power source that is rechargeable via solar energy, inductive charging, and/or a charging port.

\* \* \* \* \*